United States Patent
Rabinovitch et al.

(10) Patent No.: US 8,661,169 B2
(45) Date of Patent: Feb. 25, 2014

(54) COPYING DATA TO A CACHE USING DIRECT MEMORY ACCESS

(75) Inventors: Alexander Rabinovitch, Kfar Yona (IL); Leonid Dubrovin, Karney Shomron (IL)

(73) Assignee: LSI Corporation, San Jose, CA (US)

( * ) Notice: Subject to any disclaimer, the term of this patent is extended or adjusted under 35 U.S.C. 154(b) by 516 days.

(21) Appl. No.: 12/882,515

(22) Filed: Sep. 15, 2010

(65) Prior Publication Data
US 2012/0066456 A1 Mar. 15, 2012

(51) Int. Cl.
*G06F 13/28* (2006.01)
*G06F 3/00* (2006.01)
*G06F 13/00* (2006.01)

(52) U.S. Cl.
USPC .............................. 710/52; 710/22; 711/118

(58) Field of Classification Search
None
See application file for complete search history.

(56) References Cited

U.S. PATENT DOCUMENTS

| | | | | |
|---|---|---|---|---|
| 4,723,223 A * | 2/1988 | Hanada | | 710/26 |
| 4,858,234 A * | 8/1989 | Hartwell et al. | | 714/24 |
| 5,317,704 A * | 5/1994 | Izawa et al. | | 711/207 |
| 5,749,093 A * | 5/1998 | Kobayashi et al. | | 711/139 |
| 5,822,616 A | 10/1998 | Hirooka | | 395/842 |
| 6,182,196 B1 * | 1/2001 | DeRoo | | 711/144 |
| 7,502,891 B2 * | 3/2009 | Shachor | | 711/137 |

* cited by examiner

*Primary Examiner* — Idriss N Alrobaye
*Assistant Examiner* — Richard B Franklin
(74) *Attorney, Agent, or Firm* — Christopher P. Maiorana, PC

(57) ABSTRACT

An apparatus having a first cache and a controller is disclosed. The first cache may be configured to assert a first signal after receiving given information in response to being ready to receive additional information. The controller may be configured to (i) fetch the given information from a memory to the first cache and (ii) prefetch first information in a direct memory access transfer from the memory to the first cache in response to the assertion of the first signal.

18 Claims, 3 Drawing Sheets

| PYSICAL MEMORY | 0x0000_0000 - 0x0FFF_FFFF |
|---|---|
| P$ | 0x1000_0000 - 0x1FFF_FFFF |
| D$ | 0x2000_0000 - 0x2FFF_FFFF |
| L2$ | 0x3000_0000 - 0x3FFF_FFFF |

FIG. 2

COPYING DATA TO A CACHE USING DIRECT MEMORY ACCESS

FIELD OF THE INVENTION

The present invention relates to cache control generally and, more particularly, to a method and/or apparatus for implementing direct memory access cache prefetching.

BACKGROUND OF THE INVENTION

Caches and Direct Memory Access (DMA) transfers are used to improve processor core performance in systems where the data accessed by the processor core is located in slow or far memory. Caches are used to manage processor core accesses to the data information. A usual cache strategy is to bring a line of data into a cache on any data request from the processor core that causes a cache miss. To reduce the degradation due to cache misses, prefetch instructions or prefetch engines are used. The prefetch mechanisms support data fetching to the cache before the data is actually requested by a processor core operation.

In DMA-based systems without caches, all memory transfers can be managed by a DMA engine. The absence of the caches eliminates the cache-miss penalties. However, implementation of the DMA engine results in software re-architecture to create processor core/DMA synchronization points. The DMA engine can support advanced features like 2-dimensional/3-dimensional transfers and scatter/gather transfers. Modern Digital Signal Processors (DSP) systems can include both DMA engines and caches with some level of prefetch support.

SUMMARY OF THE INVENTION

The present invention concerns an apparatus having a first cache and a controller. The first cache may be configured to assert a first signal after receiving given information in response to being ready to receive additional information. The controller may be configured to (i) fetch the given information from a memory to the first cache and (ii) prefetch first information in a direct memory access transfer from the memory to the first cache in response to the assertion of the first signal.

The objects, features and advantages of the present invention include providing a method and/or apparatus for implementing direct memory access cache prefetching that may (i) use a DMA circuit as an address generation engine for cache prefetches, (ii) address page-based translations of DMA accesses for prefetch generation, (iii) use a single DMA circuit as a prefetch engine for several caches, (iv) select a cache based on a DMA access address, (v) select a cache based on an address range, (vi) select a cache based on a portion of the written information, (vii) enable a next prefetch with a write ready signal from a cache to the DMA circuit, (viii) detect and cancel expired prefetch operations and/or (ix) use information in the DMA message as a prefetch task indicator.

BRIEF DESCRIPTION OF THE DRAWINGS

These and other objects, features and advantages of the present invention will be apparent from the following detailed description and the appended claims and drawings in which:

FIG. 2 is a table of example address ranges of the apparatus; and

DETAILED DESCRIPTION OF THE PREFERRED EMBODIMENTS

Figure 1:
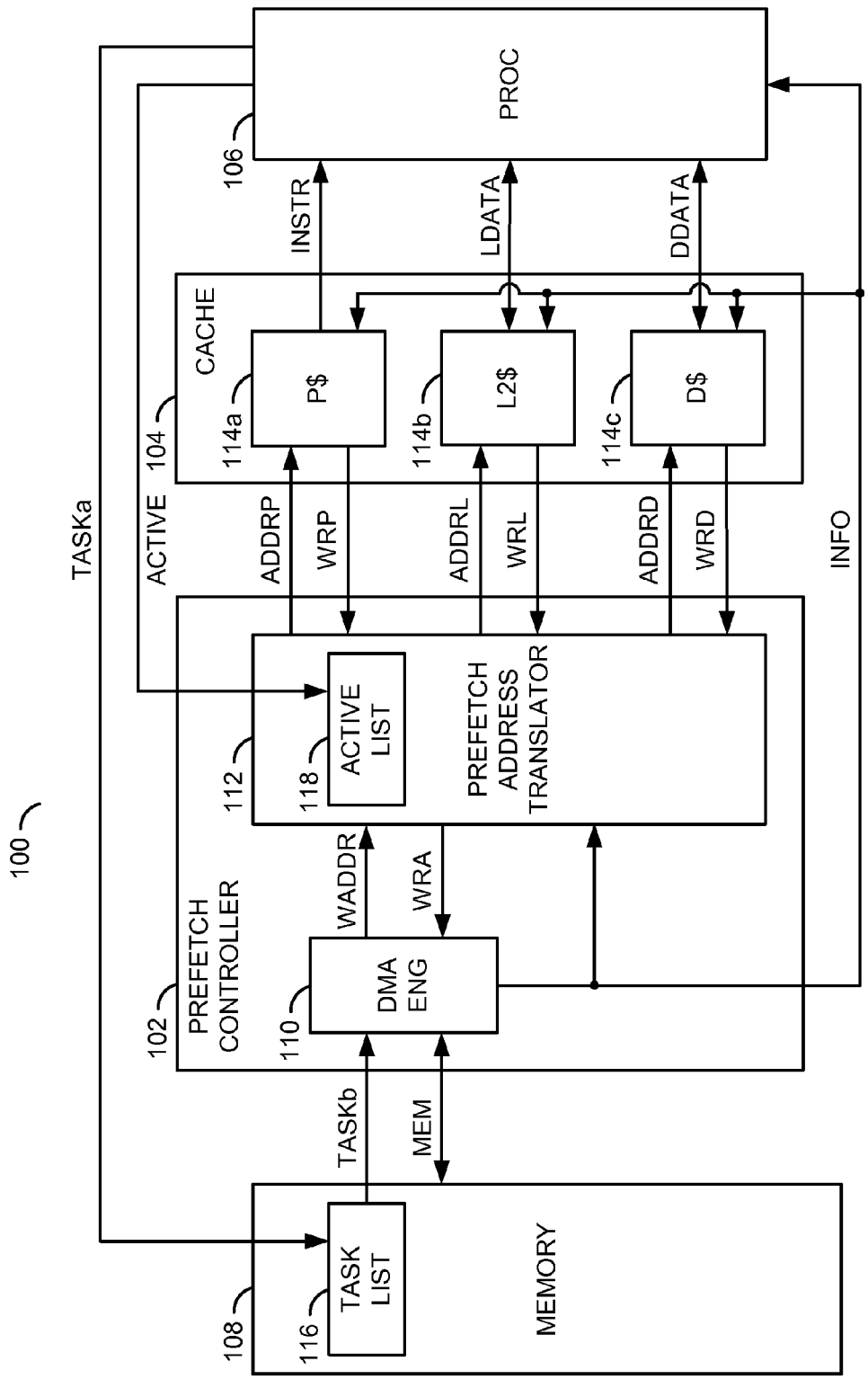
FIG. 1 is a functional block diagram of an apparatus in accordance with a preferred embodiment of the present invention.

Referring to FIG. 1, a functional block diagram of an apparatus 100 is shown in accordance with a preferred embodiment of the present invention. The apparatus (or device) 100 generally comprises a circuit (or module) 102, a circuit (or module) 104, a circuit (or module) 106 and a circuit (or module) 108. The circuit 102 generally comprises a circuit (or module) 110 and a circuit (or module) 112. The circuit 104 may comprise one or more circuits (or modules) 114a-114c. The circuits 102 to 114c may represent modules and/or blocks that may be implemented as hardware, firmware, software, a combination of hardware, firmware and/or software, or other implementations.

A signal (e.g., MEM) may be exchanged between the circuit 110 and the circuit 108. A signal (e.g., TASKa) may be generated by the circuit 106 and transferred to the circuit 108. The circuit 108 may generate a signal (e.g., TASKb) received by the circuit 110. The circuit 106 may generate and transfer a signal (e.g., ACTIVE) to the circuit 112. A signal (e.g., INSTR) may be sent from the circuit 114a to the circuit 108. The circuit 114b may exchange a signal (e.g., LDATA) with the circuit 108. The circuit 108 may exchange a signal (e.g., DDATA) with the circuit 114c.

A signal (e.g., INFO) may be presented from the circuit 110 to the circuits 106, 112 and 114a-114c. The circuit 110 may generate a signal (e.g., WADDR) received by the circuit 112. A signal (e.g., WRA) may be generated by the circuit 112 back to the circuit 110. A signal (e.g., ADDRP) may be transferred from the circuit 112 to the circuit 114a. The circuit 114a may transfer a signal (e.g., WRP) back to the circuit 112. A signal (e.g., ADDRL) may be transferred from the circuit 112 to the circuit 114b. The circuit 114b may transfer a signal (e.g., WRL) back to the circuit 112. A signal (e.g., ADDRD) may be transferred from the circuit 112 to the circuit 114c. The circuit 114c may transfer a signal (e.g., WRD) back to the circuit 112.

The circuit 102 may implement a prefetch controller circuit. The circuit 102 is generally operational to transfer blocks of information (e.g., program instructions, data, configuration information, etc.) between addressable locations via the signals MEM, INFO and WADDR. The addressable locations may be (i) between the circuit 108 and the circuit 106 and (ii) between the circuit 108 and the circuit 104. Transfers of the information blocks may be governed by task descriptors received in the signal. TASKb. Transfers of information from the circuit 108 to the circuit 104 may be considered fetches and/or prefetches, depending on what condition or event triggered the transfer. The circuit 102 generally performs as a cache prefetch addresses generation engine in designs that include both Direct Memory Access (DMA) engines and caches. In some embodiments, a single circuit 102 may be used simultaneously as a prefetch engine for several caches.

The circuit 104 may implement a cache memory circuit. The circuit 104 is generally operational to exchange one or more types of information between the circuit 106 and the circuit 108. In some embodiments, the circuit 104 may be arranged as multiple independent caches (e.g., circuits 114a-114c). Each cache may be direct mapped, multi-way set associative, multi-way skewed associative and/or fully associative. In some embodiments, one of more of the caches (e.g., circuit 114a) may implement a program cache that transfers programming instructions from the circuit 104 to the circuit 106 via the signal INSTR. In some embodiments, one or more of the caches (e.g., circuit 114b) may implement a level-2 cache that exchanges data between the circuit 104 and the circuit 108 via the signal LDATA. In other embodiments, one or more of the caches may implement a data cache (e.g., circuit 114c) that exchanges data between the circuit 104 and the circuit 108 via the signal DDATA. Transfers of data, program instructions and the like between the circuits 104, 106 and 108 may be controlled by the circuit 102. Cache misses may be handled in a normal fashion. Data written into the circuit 104 by the circuit 106 may be copied back to the circuit 108 in a normal manner.

The circuit 106 generally implements one or more processor circuits. Each circuit 106 may be operational to generate one or more information transfer tasks to be performed by the circuit 102. Each information transfer may be defined by one or more descriptors. One or more descriptors may be grouped into a task. The circuit 106 may queue (schedule) the tasks by writing the task descriptors into the circuit 108 via the signal TASKa. Once a task has been stored in the circuit 108, the circuit 102 may begin performing the tasks. The tasks may include fetch operations and prefetch operations to copy information from the circuit 108 to the circuit 106.

The circuit 108 generally implements a main memory circuit. The circuit 108 may be operational to store data, program instructions, commands, tasks and other information used by the circuit 102, the circuit 106 and optionally other circuitry of the apparatus 100. The circuit 108 generally includes a reserved address range, referred to as a list 116. The list 116 may be configured as a linked list of the information transfer tasks. New tasks may be added to the list 116 by the circuit 106 via the signal TASKa. Tasks buffered in the list 116 may be conveyed to the circuit 102 via the signal TASKb.

The circuit 110 generally implements a DMA engine (or controller) circuit. The circuit 110 may be operational to control the DMA transfers of information between the circuits 108 and 104 and between the circuit 108 and 106. In some embodiments, the circuit 110 may fetch information (e.g., data) from the circuit 108 to the circuit 114c to support program instruction executions of the circuit 106. Once the circuit 114c is ready for additional information, the circuit 110 may prefetch more information from the circuit 108 to the circuit 114c. Similar fetch and prefetch operations may be performed for the circuits 114a and 114b.

The circuit 112 may implement a prefetch address translator engine circuit. Circuit 112 is generally operational to translate addresses received from the circuit 110 in the signal WADDR into one or more of the signals ADDRP, ADDRL and/or ADDRD. The translations may be based on (i) a DMA access address in the signal WADDR, (ii) an address range that the signal WADDR falls within and/or (iii) a portion of the information in the signal INFO. The circuit 112 may also be operational to consolidate write ready information (e.g., signals WRP, WRL and WRD) into the single signal WRA. When asserted, the signal WRA generally informs the circuit 110 that the circuit 106 is ready for additional information.

A list 118 of active prefetches may be maintained in the circuit 112. The active prefetches are generally controlled by the circuit 106. Active prefetches are dynamically added to and removed from the list 118 via the signal ACTIVE. The circuit 112 may use the list 118 to cancel DMA transfers of stale information from the circuit 108 to the circuit 106.

Prefetch information is usually transferred to a cache before the information is actually requested by the circuit 106. In some cases, an "expired prefetch" may occur where the information being transferred may not be requested by the circuit 106 any time soon. For example, execution of the program instructions may have reached a branch instruction and deviated away from a most-likely branch path. Stopping the prefetch of instructions and data along the branch path not taken is generally preferred.

Where the circuit 102 (i) is used as the prefetch generation engine that generates write addresses and (ii) the write addresses are used as the prefetch addresses, the information corresponding to the write addresses may indicate the number of the active prefetch task. Hence, the circuit 112 may use the list 118 of the active prefetch tasks to distinguish from useful prefetch tasks and stale prefetch tasks. If the access indicates tasks that are in the list 118, the prefetch tasks may be allowed to continue. If the access indicates tasks that are not in the list 118, the prefetch may be disregarded to prevent cache pollution. The circuit 112 may stop an expired prefetch task by asserting the signal WRA. The circuit 110 may respond to the asserted signal WRA by ending the DMA transfer in progress, thus minimizing the DMA transfer cycles spent to prefetch the expired task. The circuit 106 may update the list 118 of active prefetch tasks from time to time based on the executed tasks. The circuit 106 may (i) add to the list 118 tasks that have been program in the circuit 110 for prefetch and (ii) remove from the list 118 tasks that have already been executed.

Referring to FIG. 2, a table of example address ranges of the apparatus 100 is shown. The circuit 112 generally performs an address page-based translation of DMA accesses for prefetch generations. The translation may result in a mirror mapping of the circuit 108 to different pages for different circuits 114a-114c. Accesses to the mirror pages generally indicate the prefetch address and particular cache to be used.

By way of example, consider a 256-megabyte memory (e.g., circuit 108) mapped from a lowest address of 0x0000_0000 (hexadecimal) to a highest address of 0x0FFF_FFFF (hexadecimal). The example may include a program cache P$ (e.g., circuit 114a), a level-2 cache L2$ (e.g., circuit 114b) and a data cache D$ (e.g., circuit 114c). Each prefetch address page may be located in the address ranges illustrate in FIG. 2. If the circuit 110 generates access to 0x2000_1234 in the signal WADDR, the circuit 112 may determine that the address is for the cache D$ (e.g., having a most-significant bit of 2 and/or within address range of 0x2000_0000 to 0x2FFF_FFFF). The circuit 112 generally translates the access to 0x2000_1234 as a prefetch access to an address 0x0000_1234 in the cache D$. The address 0x0000_1234 may be presented in the signal ADDRD to the cache D$.

In some embodiments, a single mirror prefetch address space may be used. In such a case, cache selection is generally based on the written information. For example, the selection among the caches P$, L2$ and D$ may be determined with the circuit 112 by examining multiple (e.g., two) most-significant bits of the prefetch information received in the signal INFO. If the most-significant bits are 00 (binary), the circuit 112 may access the cache P$. If the most significant bits are 01, the circuit 112 may access the cache D$. If the most significant bits are 11, the circuit 112 may access the cache L2$. In some embodiments, the information in a DMA message may be used as a prefetch task indicator.

To eliminate queuing of several prefetch requests in the caches, one or more "write ready" signals (e.g., WRP, WRL and WRD) may be generated by the circuit 104 (e.g., the individual circuits 114a-114c). When a circuit 114a-114c is ready to receive additional information, the circuit 114-114c may assert the corresponding signal WRP, WRL or WRD. The circuit 112 may respond to the assertions by asserting the signal WRA back to the circuit 110. In some embodiments, the signal WRA may include an indication of which one or more of the signals WRP, WRL and/or WRD is currently asserted. Assertion of the signal WRA generally allows the circuit 110 to issue a next write address to a particular prefetch mirror page.

Figure 3:
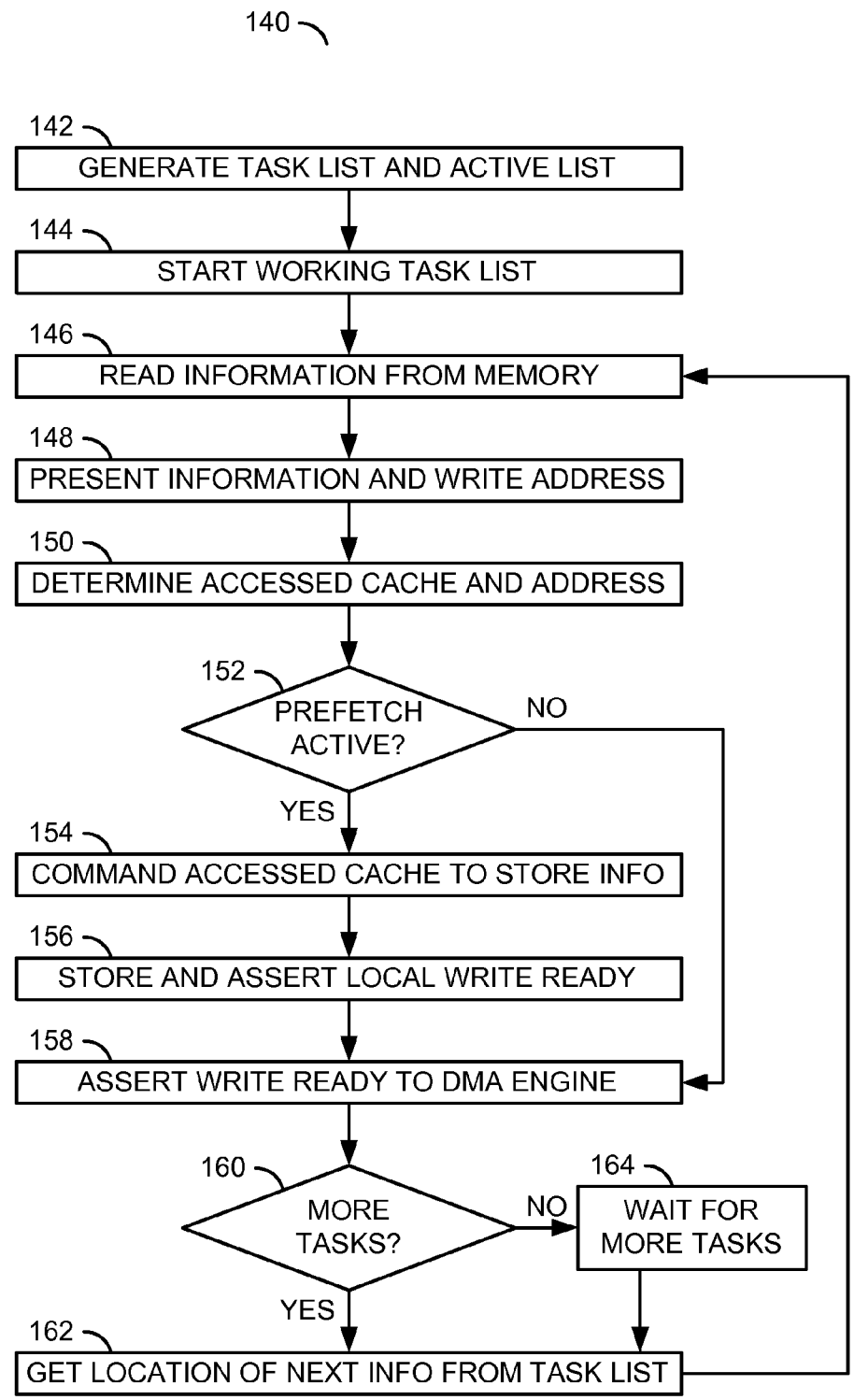
FIG. 3 is a flow diagram of an example prefetch method.

Referring to FIG. 3, a flow diagram of an example prefetch method 140 is shown. The method (or process) 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162 and a step (or block) 164. The method 140 may be implemented by the apparatus 100. The steps 142 to 164 may represent modules and/or blocks that may be implemented as hardware, firmware, software, a combination of hardware, firmware and/or software, or other implementations.

In the step 142, the circuit 106 may populate the list 116 via the signal TASKa and the list 118 via the signal ACTIVE. The circuit 110 may access the list 116 through the signal TASKb in the step 144 and begin working on the tasks. An initial task may cause information to be read from the circuit 108 to the circuit 110 in the step 146. The information and a write address may be transferred from the circuit 110 to the circuit 112 in the step 148 via the signals INFO and WADDR respectively. In the step 150, the circuit 112 may determine which of the circuits 114a-114c should receive the information and the corresponding mirrored write address.

In the step 152, the circuit 112 may check the list 118 to determine if the fetch/prefetch is active. If the fetch/prefetch is active (e.g., the YES branch of step 152), the circuit 112 generally commands the accessed circuit 114a-114c in the step 154 to store the information in the signal INFO. In the step 156, the accessed circuit 114a-114c may store the information from the signal INFO and assert the signal WRD to indicate a readiness to receive more information. The circuit 112 may respond to the assertion of the signal WRP, WRL and/or WRD by asserting the signal WRA in the step 158. The circuit 110 may respond to the assertion of the signal WRA after the DMA transfer has completed by checking for more tasks in the step 160.

If the active task check of step 152 finds that the current transfer is inactive (e.g., the NO branch of step 152), the circuit 112 may assert the signal WRA in the step 158. The circuit 110 may respond to the asserted signal WRA in the middle of the DMA transfer by cancelling the DMA transfer.

If more tasks are available in the list 116 (e.g., the YES branch of step 160), the circuit 110 may obtain the next task in the step 162. Returning to the step 146, the circuit 110 may read the next prefetch information from the circuit 108 based on the new task. If the list 116 is empty (e.g., the NO branch of step 160) the circuit 110 may wait for one or more additional tasks to be loaded into the list 116. The circuit 110 may subsequently get the next newly loaded task from the list 116 in the step 162.

The functions performed by the diagrams of FIGS. 1 and 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first of a plurality of caches configured to assert a first signal in response to being ready to receive additional information; and a controller configured to (i) select said first cache in response to a condition of first information stored in a memory and (ii) copy said first information in a direct memory access transfer from said memory to said first cache in response to both said assertion of said first signal and said selection of said first cache; wherein (i) said memory occupies a memory address range inside a predetermined range, (ii) said first cache occupies a first address range inside said predetermined range and outside said memory address range and (iii) said copy of said first information mirrors one or more first pages of said memory address range into said first address range.

2. The apparatus according to claim 1, further comprising a second of said caches configured to assert a second signal to said controller.

3. The apparatus according to claim 2, wherein said controller is further configured to (i) select said second cache in response to a condition of second information stored in said memory and (ii) copy said second information from said memory to said second cache in response to said assertion of said second signal.

4. The apparatus according to claim 1, wherein (i) a second of said caches occupies a second address range inside said predetermined range and outside both said memory address range and said first address range and (ii) a copy of second information from said memory to said second cache mirrors one or more second pages of said memory address range into said second address range.

5. The apparatus according to claim 1, wherein said condition comprises an access address of said first information.

6. The apparatus according to claim 1, wherein said condition comprises an address range of said first information.

7. The apparatus according to claim 1, wherein said condition comprises one or more bits in said first information.

8. The apparatus according to claim 1, wherein said controller is further configured to cancel said copy of said first information in response to said first information being absent from a list of active tasks.

9. The apparatus according to claim 1, wherein said controller is further configured to translate a physical address of said first information as read from said memory into a cache address in said first cache.

10. A method for direct memory access cache copying, comprising the steps of:

(A) asserting a first signal from a first of a plurality of caches to a controller in response to said first cache being ready to receive additional information;

(B) selecting said first cache in response to a condition of first information stored in a memory; and (C) copying said first information in a direct memory access transfer from said memory to said first cache in response to both said assertion of said first signal and said selecting of said first cache; wherein (i) said memory occupies a memory address range inside a predetermined range, (ii) said first cache occupies a first address range inside said predetermined range and outside said memory address range and (iii) said copying of said first information mirrors one or more first pages of said memory address range into said first address range.

11. The method according to claim 10, further comprising the step of:
asserting a second signal from a second of said caches to said controller.

12. The method according to claim 11, further comprising the steps of:
selecting said second cache in response to a condition of second information stored in said memory; and
copying said second information from said memory to said second cache in response to said assertion of said second signal.

13. The method according to claim 10, wherein (i) a second of said caches occupies a second address range inside said predetermined range and outside both said memory address range and said first address range and (ii) copying of second information from said memory to said second cache mirrors one or more second pages of said memory address range into said second address range.

14. The method according to claim 10, wherein said condition comprises an access address of said first information received by said controller.

15. The method according to claim 10, wherein said condition comprises an address range of said first information.

16. The method according to claim 10, wherein said condition comprises one or more bits in said first information.

17. The method according to claim 10, further comprising the step of:
cancelling said copying of said first information in response to said first information being absent from a list of active tasks.

18. An apparatus comprising:
a plurality of caches configured to assert a plurality of signals each in response to being ready to receive additional information; and
a controller configured to (i) select a first of said caches in response to a condition of first information stored in a memory and (ii) copy said first information from said memory to said first cache in response to both said assertion of a corresponding first of said signals and said selection of said first cache, wherein (a) said memory occupies a memory address range inside a predetermined range, (b) said first cache occupies a first address range inside said predetermined range and outside said memory address range and (c) said copy of said first information mirrors one or more first pages of said memory address range into said first address range.

* * * * *